Feb. 9, 1960

N. C. WILLIAMS 2,924,205

EXHAUST BRAKE SYSTEM

Filed Sept. 24, 1956

INVENTOR
Norman C. Williams

BY

AGENT

Feb. 9, 1960

N. C. WILLIAMS 2,924,205

EXHAUST BRAKE SYSTEM

Filed Sept. 24, 1956

INVENTOR
Norman C. Williams

BY

AGENT

# 2,924,205

EXHAUST BRAKE SYSTEM

Norman C. Williams, Portland, Oreg., assignor to Power Brake Equipment Company, a corporation of Oregon Application September 24, 1956, Serial No. 611,728

14 Claims. (Cl. 123—97)

This invention relates generally to braking systems for automotive vehicles and more particularly to exhaust braking systems of the type disclosed in my U.S. Patent No. 2,805,656 issued Sept. 10, 1957 and to my co-pending U.S. patent application, S.N. 591,895, filed June 8, 1956 of which this application is a continuation in part.

An illuminating discussion of the prior art in this field applying particularly to English and European practice is found in the English periodical "Automobile Engineer," March 1954 issue, page 98.

It is the general purpose of this invention to provide an engine braking exhaust system with pneumatic controls adaptable to either Otto cycle or diesel cycle engines and vehicles using either air pressure or vacuum air for wheel brake operation and therefor available for actuation of the exhaust brake system.

Exhaust braking systems have for their object the retardation of moving vehicles by keeping the engines connected to the driving wheels in the usual manner through the driving transmission and operating the engine with a negative power output. The operation of braking an engine is accomplished by permitting the throttle to assume its idling position and then blocking the exhaust pipe between the exhaust manifold and the muffler. In doing this the exhaust pressure may be built up to a value of fifty or sixty pounds per square inch.

To make the Otto cycle engine effective for exhaust braking it is necessary when the exhaust line is blocked to admit air freely to the inlet manifold to substantially shut off the fuel supply. This is accomplished by opening to atmosphere the air and fuel mixture supply duct between the carburetor and the inlet manifold or by opening the inlet manifold direct to atmosphere as here shown.

In using the diesel cycle engine for exhaust braking it is desirable to continue to let an idling amount of fuel to pass through the fuel injection means for lubrication of the injector parts. The idling position of the throttle allows this minimum lubrication amount of fuel to flow.

As explained in the March 1954, issue of Automobile Engineer above referred to, the European practice is to operate the exhaust braking system only at the extremes of no effect or full effect, it being understood that an exhaust brake is not a stopping brake but is a retarding brake whose effect varies with vehicle speed and the gearing selected in the transmission connecting the engine with the wheels. The higher the engine speed the higher will be the work input from the wheels to the engine. However in the western part of the United States where long highway grades of varying pitch are common it is desirable to vary the retarding effect of the exhaust braking system to maintain an approximately contsant vehicle speed without continually changing gears or overworking the wheel brakes.

However I have found that if the exhaust braking mechanism is left in its applied condition when the engine has slowed to near its normal idling speed, the engine will develop too little power to continue operating or, in other words, the engine will be so starved of fuel that it will not develop sufficient power to continue to operate. In this case the engine must be restarted before it can pick up its load and the restarting of the engine so interferes with the normal operation of the vehicle as to be undesirable.

It is a general object of the present invention to provide an exhaust braking system with full pneumatic operation of the exhaust braking elements together with the unique mechansms needed for modulation of the braking effect.

It is the primary object of this invention to provide an exhaust brake system with means to ease or eliminate the exhaust braking influences on the engine before the engine speed has dropped to a speed at which insufficient fuel will be fed to the engine to keep it operating under its own power.

It is a second object to provide an exhaust brake system with engine speed responsive means which will ease or eliminate the exhaust braking influences on the engine before the engine speed has dropped to a speed at which insufficient fuel will be fed to the engine to keep it operating under its own power.

It is a third object to provide an exhaust brake system with engine speed responsive means which will block the carburetor bypass air ducts of the system before the engine speed has dropped to a speed at which insufficient fuel will be fed to the engine to keep it operating under its own power.

It is a fourth object to provide an exhaust brake system with engine speed responsive means which will release the exhaust line damper of the system to its open position before the engine speed has dropped to a speed at which insufficient fuel will be fed to the engine to keep it operating under its own power.

How these and other objects are attained is explained in the following description referring to the attached drawings in which:

Fig. 1 shows schematically a form of exhaust braking system in which my invention may be practiced.

Fig. 2 is a side sectional elevation through the valve 35 and one form of the valve operator 24 of Fig. 1 when the sheave 23 is rotating below a preset speed.

Like reference numerals refer to like parts in the several figures of the drawings.

Figure 1:
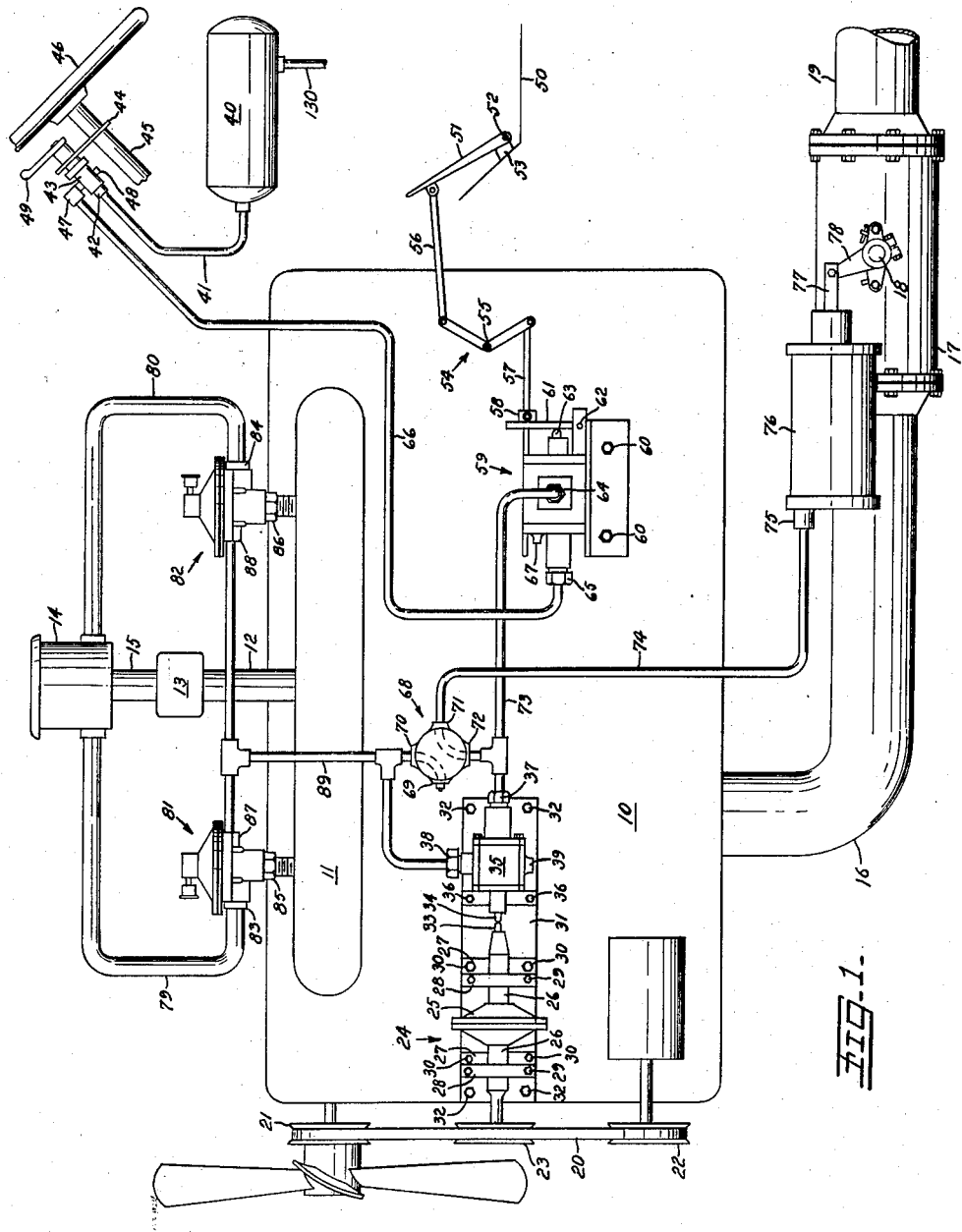

Referring now to the drawings, in Fig. 1 there is shown an internal combustion engine main block 10 to which is attached an air and fuel inlet manifold 11 connected by conduit 12 with carburetor 13 connected to air cleaner 14 by conduit 15.

Exhaust gas conduit 16 conducts exhaust gas from the exhaust manifold, not shown, to housing 17 of an exhaust brake damper, not shown, secured to axle 18 journalled in housing 17 one end of which is open to atmosphere through exhaust pipe 19.

Figure 2:
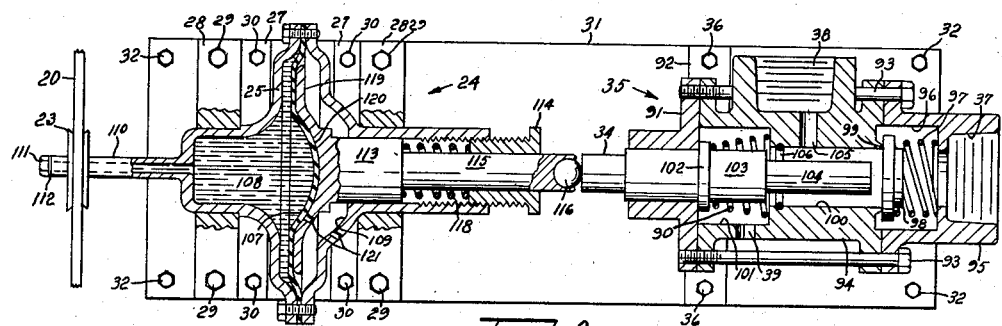
Figure 3:
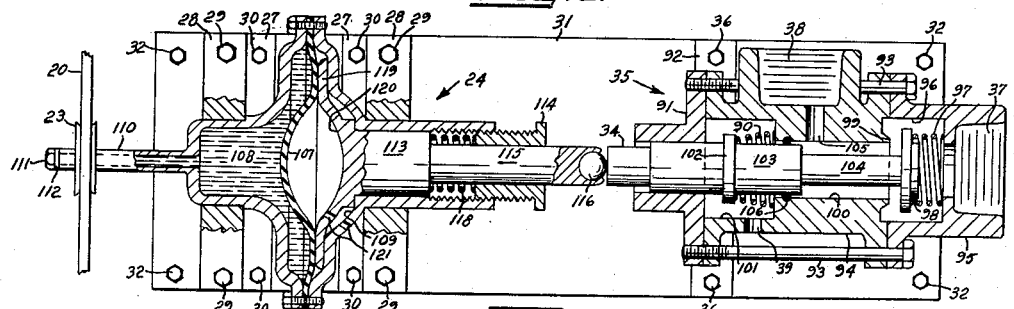
Fig. 3 shows the mechanism of Fig. 2 when sheave 23 is rotating above a preset speed.

Through a sheave, not shown, the engine main shaft, not shown, drives belt 20 which in turn drives fan sheave 21, a generator sheave 22 and sheave 23 of speed responsive centrifugal means 24 which may be the novel form of liquid filled device of Figures 2 and 3 or in its preferred form may be the engine's cooling water centrifugal pump, not shown, combined with a simple differential pressure valve operator. Either form of the speed responsive centrifugal means 24 will operate to move stem 34 of valve 35 to the right against the bias of spring 90 whenever sheave 23 is above a preset speed and to allow spring 90 to return stem 34 to the left whenever sheave 23 is below a preset speed.

Valve 35 is seen to have a supporting cap 91 with foot bracket 92 secured by screws 36 to plate 31 secured by screws 32 to engine block 10. Secured by screws 93 to cap 91 are valve body 94 and inlet cap 95. Inlet cap 95 is formed externally with inlet connection 37 and internally with inlet valve space 96 in which spring 97 biases inlet valve 98 towards its seat 99 around the inlet end of cylindrical body cavity 100 which is enlarged at its opposite end to form exhaust space 101 opened to atmosphere through exhaust port 39. Valve stem 34 longitudinally slidably supported, as shown, in supporting cap 91 is seen to be formed with a collar section 102 a cylindrical exhaust valve section 103 and an inlet valve plunger section 104. As shown spring 90 axially restrained by body 94 and collar 102 urges stem 34 to the left until stopped by stem collar 102 striking the inner side of support cap 91. Internal cavity 100 of body 94 is connected by outlet port 105 with outlet connection 38. O ring 106 set into the wall of body cavity 100 forms an exhaust valve seat to cooperate with exhaust valve section 103 of stem 34 to seal body cavity 100 from exhaust space 101 when stem 34 is moved to the right. Also as seen in Fig. 3 further movement of stem 34 to the right causes plunger section 104 of stem 34 to unseat inlet valve 98 from its seat 99. When stem 34 is moved to the left inlet valve 98 closes on its seat 99 to isolate body cavity 100 from inlet 37 and then exhaust valve stem section 103 moves out of exhaust valve seat O ring 106 to connect outlet 38 to the atmosphere through outlet port 105 body cavity 100 exhaust space 101 and exhaust port 39. Movement of stem 34 to the right first closes exhaust valve 103 on its seat 106 and then lifts inlet valve 98 from its seat 99 to connect inlet 37 to outlet 38 through inlet valve space 96, body cavity 100 and exhaust port 105.

In Figures 2 and 3 one form of the valve operator 24 is seen to comprise a hollow body 25 the interior of which is separated by a transverse flexible diaphragm 107 into a liquid chamber 108 and an air chamber 109. Hollow body 25 is rotatably supported on bearing brackets 27 secured by screws 30 to plate 31. Bearing caps 28 are secured to brackets 27 by screws 29. At its left end body 25 is formed with a smaller diameter extension 110, to support sheave 23. Extension 110 is formed with an axial bore for filling space 108 with a liquid such as a common antifreeze like "Prestone." The outer end of extension 110 is internally threaded to receive filling screw 111 which holds sealing washer 112 in place. At its right hand end body 25 is axially bored and threaded slidably to receive piston 113 and threadedly to receive adjusting nut 114 bored slidably to receive the small diameter extension 115 of piston 113. The free end of extension 115 is formed to confine bearing ball 116 freely rotatably therein. Spring 118 adjustably tensioned by nut 114 continuously biases piston head 119 against diaphragm 107. Starting with the condition shown in Fig. 2 wherein sheave 23 is rotating body 25 at less than a preset speed we see that in order to accommodate all of the liquid in the solid fill 108, diaphragm 107 takes the shape of the entire face of piston head 119 including the depression 120 but as the rotation of sheave 23 and body 25 is increased centrifugal force will cause more and more of the liquid to move out to a larger diameter position and displace the outer part of the diaphragm to the right taking with it piston 113 of operator 24 and stem 34 of valve 35 against the combined biasing forces of springs 90 and 118 until valve 35 operates as above explained to close exhaust valve 103 on its seat 106 and raise inlet valve 98 from its seat 99 against the additional bias of spring 97. Since the space 108 in operator body 25 is solidly filled with liquid, as more liquid moves out to a larger diameter there will be less liquid near the axis of rotation and diaphragm 107 must change shape to keep space 108 with the same volume at all times. It is seen that the depression 120 in the face of piston head 119 makes it possible for the simple form of diaphragm 107 to allow a considerable axial throw of piston 113 without causing it to be vacuum bound. On the air side of diaphragm 107 it is to be noted that air holes 121 in piston head 119 and body 25 respectively will relieve the mechanism of any danger of air binding.

Since the exhaust brake system here schematically shown as a form in which my invention may be practiced is designed to be pneumatically controlled, a source of air power maintained at a pressure other than atmospheric is indicated as a storage tank 40 connected by tube 41 to inlet 42 of the vehicle operator's exhaust brake control valve 43 secured by bracket 44 to supporting post 45 of steering wheel 46. Control valve 43 includes an outlet port 47 and an atmospheric port 48 and internal means movable by hand lever 49 between an exhaust brake off position at which outlet port 47 is connected to atmospheric port 48 and an exhaust brake on position at which outlet port 47 is connected to inlet 42.

Schematically indicated at 50 is the floor of the operator's cab of the vehicle to which fuel throttle lever 51 is shown to be pivoted at pin 52 of bracket 53. Bell crank 54 pivoted at 55 on engine block 10 has one arm linked as shown by link 56 to lever 51 and the other arm linked to rod 57 carrying stop 58 to operate valve 59 secured as shown to engine block 10 by screws 60. As is well known the foot throttle pedal of any such vehicle is biased upwardly or clockwise about pin 52 as shown for pedal 51. Thus in the idling position of pedal 51, pedal 51 and bellcrank 54 will each be rotated in their clockwise direction about their respective pivot pins 52 and 55 and stop 58 on rod 57 will press against lever 61 pivoted at 62 to press operating stem 63 of valve 59 to connect outlet port 64 to inlet port 65 connected by tube 66 to outlet port 47 of hand control valve 43.

When the operator presses on foot throttle 51 to obtain more driving power from the engine there is no further use for the application of the exhaust brake mechanism and at the first movement of rod 57 to the right the outward bias of stem 63 moves stem 63 with lever 61 to the right and the internal mechanism of valve 59 blocks inlet port 65 and connects outlet port 64 to atmospheric port 67.

Four way manually positionable valve 68 as schematically indicated comprises a stator having four ports 69, 70, 71 and 72 and a rotor having a pair of independent conduits one of which at any of our quadrilateral positions of the rotor will connect together an adjacent pair of ports while the other conduit connects together the remaining two ports. As shown port 69 is not here used and is plugged and with the stator in the indicated position port 70 is blocked while ports 71 and 72 are connected together. It is plain that should the rotor of valve 68 be moved ninety degrees in a clockwise direction from the position shown port 72 would be blocked and port 71 would be connected to port 70.

Tube 73 connects outlet port 64 of valve 59 with inlet port 37 of valve 35 and port 72 of valve 68.

Tube 74 connects outlet port 71 of valve 68 to port 75 of pneumatic operating cylinder 76 enclosing a piston biased towards a direction of throw of piston rod 77 which through crank arm 78 will turn axle 18 to move the exhaust line damper housed in housing 17 to the open position of exhaust line 16, 17, 19. However if air under pressure other than atmospheric is applied from tank 40 to cylinder 76 through either of the paths shown the bias of the piston in cylinder 76 will be overcome and piston rod 77 will move crank arm 78 to rotate axle 18 to move the exhaust line damper to the substantially closed position of exhaust line 16, 17, 19.

Figure 4:
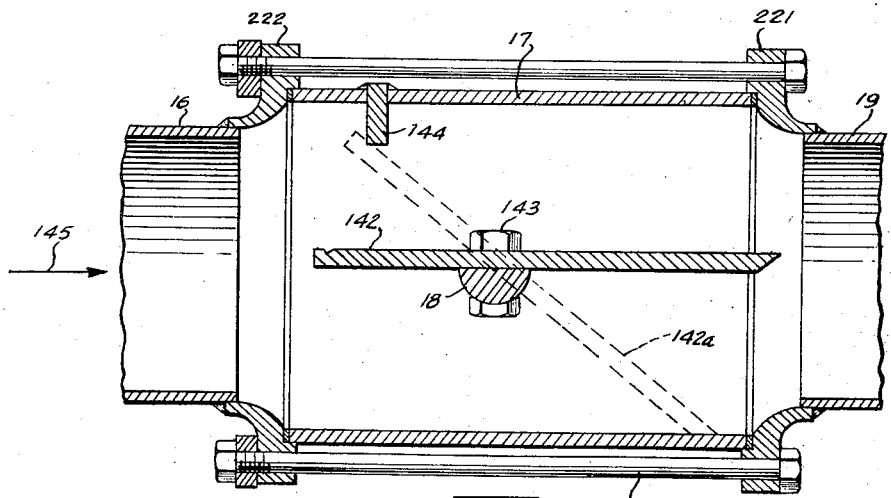
Fig. 4 is a longitudinal sectional elevation through the exhaust damper apparatus 17 of Fig. 1.

As seen in Figs. 1 and 4, the exhaust damper housing 17 is held by bolts 223 between end flanges 222, 221, of exhaust gas conduit 16 and exhaust pipe 19, respectively. Housing 17 is formed with a pair of open ended diametrically opposed bearing hubs not shown, adapted rotatably to receive axle 18 reduced at its protruding end to form a thrust bearing surface adapted to abut a mating thrust bearing surface not shown formed on housing 17. Axle 18 is also flattened within the inner diameter of cylinder 17 to receive along its center plane the damper 142 to which it is secured by bolts 143. Segment shaped barrier 144 is formed downwardly from the inner top side of cylinder 17 to abut the cut off upper end of damper 142 when in its closed position, 142a, shown dotted in Fig. 4. Below its cut off upper end the edge of damper 142 is formed to be parallel with the inner wall of cylinder 17 when in its closed position 142a.

Note that the exhaust gas travel through cylinder 17 is in the direction of arrow 145 at the left of Fig. 4 and since damper 142 has greater exposed area on its down stream half than on its upstream half, the pressure of the exhaust gas is in the direction to apply a net opening force, or opening bias to damper 142.

Air by-pass conduits 79, 80, respectively connect air cleaner 14 with inlet ports 83, 84, of valves 81 and 82 which have their outlet ports 85, 86, connected to inlet manifold 11. It is seen that if valves 81, 82 are closed by-pass lines 79, 80 will be closed and the engine will receive fuel and combustion air normally through the air cleaner 14, conduit 15, carburetor 13, conduit 12, and inlet manifold 11. But if valves 81, 82 are opened the resistance to air flow of carburetor 13 will cause most of the air passing between air cleaner 14 and manifold 11 to traverse conduits 79, 80 so that only a small amount of fuel will be fed to the engine.

Valves 81, 82 are a common type of diaphragm valve biased internally to their closed positions. However when air under pressure other than atmospheric is applied from tank 40 to the control ports 87, 88 respectively of valves 81, 82, valves 81, 82 will immediately open to by-pass carburetor 13.

It is, of course, understood that my pneumatically controlled exhaust brake system may be aplied to any vehicle using pneumatically controlled wheel brakes and that commonly the air for operating the exhaust brake mechanism will be supplied by the tank 40. If the wheel brakes are to be operated by air under a pressure above atmosphere then tank 40 will receive air through tube 130 from an engine driven air compressor, not shown but carried on the vehicle whose wheel brakes are operated.

However if the vehicle wheel brakes are to be vacuum operated, tank 40 will be partially evacuated of air through means not shown but well known in the art.

It also is understood that the wheel brakes of the vehicle are the stopping brakes, with the engine brake (exhaust brake) added for keeping the vehicle under control by relieving the wheel brakes of less than full application duty over longer periods of time in order that the wheel brakes will always be cool and in condition for complete stopping of the vehicle. Therefore the exhaust brake operating mechanism must not be allowed to overdraw energy from tank 40 and leave too little energy stored in tank 40 for safe operation of the wheel brakes.

Just as it was found to be desirable to provide engine speed responsive means, like 24, to prevent the continued opening to atmosphere of by-pass valves 81 and 82 and thus to assure the continued operation of the engine, it is also desirable to limit the use of actuating air by the exhaust brake system on an indication of reduced air power availability.

From the foregoing disclosure it is plain that a truck driver having the present brake equipment at his disposal and driving either in hilly rural areas or in urban areas requiring frequent starts and stops will, once he gets going, move his manual lever 49 to the brake-on position he finds by experience to a best average for his use. He can of course change this position as conditions require. With manual lever thus set his normal application of his exhaust brake system will then be by positioning his foot throttle pedal. When his foot is on the throttle pedal 51, and fuel is being fed to the engine, then air under the control pressure of tank 40 as modulated by valve 43, is in line 66 but blocked by valve 59. Then if the operator relaxes the foot throttle to its idling fuel position air under tank 40 control pressure will pass valve 59 to tube 73. Since the engine is above idling speed control air will pass from tube 73 through valve 35 to tube 89 and valves 81, 82 to open valves 81, 82 to by-pass carburetor 13. At the same time depending on the setting of valve 68 control air will pass either from tube 73 or tube 89 to tube 74 and cylinder 76 to close the exhaust damper and complete the setting of the exhaust brake system.

Should the need for the use of the exhaust brake system pass and the driver desire to increase his speed he merely steps on his throttle pedal and the exhaust brake effort is removed but remains immediately available for automatic resetting whenever the driver takes his foot off the throttle.

However if the exhaust brake system is applied for a sufficient length of time for the engine speed to drop to such a value that it has been found that the engine will cease to operate under its own power with the exhaust brake system applied, the engine speed responsive means 24 will have operated valve 35 to stop line 73 at port 37 and open line 89 to atmosphere at port 38 thus causing valves 81, 82 to close and put the carburetor back into normal use.

Whether or not it is necessary or desirable to use valve 68 set in its position shown where the exhaust damper is not opened when valve 35 is closed by the speed responsive means 24 or whether it is more desirable to use valve 68 set to connect tubes 89, 74 so that the exhaust damper will be opened at the speed setting of means 24, will depend on the engine, its condition and the character of its use. If it is definitely decided that a particular one of the settings of valve 68 will always be used for the particular rig, then valve 68 may be omitted and the system permanently piped for the one condition.

Having recited some of the objects of my invention, illustrated and described several forms in which my invention may be practiced and explained the uses thereof, I claim:

1. A compression brake system for an internal combustion engine having a fuel supply means, an exhaust gas line, a throttle for varying the rate of fuel supply to said engine to vary the power output thereof, said throttle being incapable of reducing the rate of fuel supply below a preset rate and said system including a damper in said exhaust line, means biasing said damper toward the open position thereof, a first means operable by air pressure to move said damper towards its closed position, fuel reducing means for reducing the rate of fuel feed to said engine below said preset rate, a second means operable by air pressure to operate said fuel reducing means, means responsive to the position of said throttle to prevent the application of operating air to either said first means or said second means when said rate of fuel supply is above said preset rate and means responsive to a drop in engine speed to a preset value to prevent the application of operating air only to said second means operable by air pressure.

2. The compression system of claim 1 in which said means responsive to the drop in speed of said engine is effective to prevent the application of operating air to said first means operable by air pressure.

3. A compression brake system for an internal combustion engine having an exhaust gas line, a fuel supply means and foot throttle means for varying the rate of fuel supply to said engine by said fuel supply means to vary the power output of said engine, said throttle means having a minimum fuel position establishing a minimum rate at which fuel will be supplied to said engine under normal idling conditions thereof, said system comprising: a first means operable to impede the flow of exhaust gas through said exhaust gas line, a second means operable to reduce the rate of fuel supply to said engine by said fuel supply means and fluid power means for operating said first means and said second means; said fluid power means comprising a source of fluid under pressure, a first fluid motor means for operating said first means, a second fluid motor means for operating said second foot throttle controlled means for supplying operating fluid from said fluid source to both said fluid motor means when said foot throttle is in its said minimum fuel position and a condition responsive means for preventing said foot throttle controlled means from supplying said operating fluid to one of said fluid motor means.

4. The compression brake system of claim 3 in which said condition responsive means includes a fluid valve and an operator therefor, said fluid valve having an inlet opening, an outlet opening, a valve stem, means for operating said valve stem in one direction to connect said inlet opening with said outlet opening and biasing means for biasing said stem in the other direction to isolate said inlet opening from said outlet opening.

5. The compression brake system of claim 4 in which said condition is the speed of rotation of said engine and said means for operating said valve stem in said one direction comprises means rotating in response to the speed of said engine to develop operating force for said stem responsive to the speed of said engine and means for applying said force to said stem.

6. The compression brake system of claim 5 in which said means rotating in response to the speed of said engine comprises a liquid filled hollow body having a flexible wall and means biasing said wall in one direction of its axis of rotation to reduce the moment of inertia of the liquid fill about said axis, said wall being movable in the other direction of its axis of rotation by an increase in the moment of inertia of the liquid fill as the speed of rotation of said body and said liquid fill is increased.

7. The compression brake system of claim 4 in which said condition is the speed of rotation of said engine and said means for operating said valve stem in said one direction comprises a centrifugal pump connected to said motor for responsive rotation therewith, a differential diaphragm piston operator for said stem and conduit means connecting the opposite sides of said piston respectively with the inlet and outlet of said pump.

8. The compression brake system of claim 7 in which said centrifugal pump is the cooling water circulating pump of said engine.

9. A pneumatically operated exhaust braking system for an internal combustion engine driven vehicle comprising an engine having an inlet manifold, an air inlet duct connecting said inlet manifold with the atmosphere, an exhaust duct connecting said exhaust manifold with the atmosphere, a damper in said exhaust duct, a pneumatic operator for said damper adapted to be operated by the application of air thereto at a pressure other than atmospheric pressure, a source of air at other than atmospheric pressure, a service duct connecting said source with said operator and a control valve in said service duct adapted to be operated to connect said source with said operator through said service duct and said value.

10. The exhaust braking system of claim 9 including a normally open valve in said service duct between said control valve and said operator, said normally open valve being operable to block said service duct between said control valve and said normally open valve and then to open said service duct to atmosphere between said normally open valve and said operator.

11. A pneumatically operable exhaust braking system for an internal combustion engine driven vehicle comprising: an engine having an inlet manifold; an air inlet duct connecting said inlet manifold with a source of air, a by-pass valve opening from the atmosphere to said inlet duct between said air source and said inlet manifold, and a pneumatic operator for said by-pass valve; an exhaust duct connecting said exhaust manifold with the atmosphere, a damper in said exhaust duct, and a pneumatic operator for said damper; a storage tank for air at a selected pressure; a first service duct connecting said tank with said operator for said damper, a control valve in said first service duct, and a second service duct connecting said first service duct between said control valve and said damper operator with said operator for said by-pass valve; and said control valve being adapted to control the air pressure in said service duct simultaneously to position said damper operator and said by-pass valve operator.

12. The exhaust braking system of claim 11 including a second valve in said first service duct between said control valve and said second service duct, said second valve being normally open and operable to close said first service duct and then to open said first service duct to atmosphere between its position of closure of said first service duct and said second service duct.

13. A pneumatically operated exhaust braking system for an internal combustion engine driven vehicle comprising an engine having an inlet manifold, an air inlet means connecting said inlet manifold with the atmosphere, an exhaust manifold, an exhaust conduit connecting said exhaust manifold with the atmosphere, a damper in said exhaust conduit, said damper being variably positionable between an open position and a substantially closed position of said conduit, said damper being biased toward its said open position by the exhaust gases in said conduit, a pneumatic operator for said damper adapted to oppose the bias of said exhaust gases on said damper, a source of air at other than atmospheric pressure, a service air duct connecting said source with said operator and a pressure regulating valve in said service air duct, said regulating valve being variably positionable to set the air pressure required by said pneumatic operator to position said damper to maintain a desired back pressure on said exhaust gases in said exhaust manifold.

14. The exhaust braking system of claim 13 including a normally open valve in said service air duct between said pressure regulating valve and said operator, said normally open valve being operable to block said service duct and then to open said service duct to atmosphere between said normally open valve and said operator.

References Cited in the file of this patent

UNITED STATES PATENTS

| | | |
|---|---|---|
| 1,222,985 | Pharo | Apr. 17, 1917 |
| 1,508,464 | McFarland | Sept. 16, 1924 |
| 1,890,790 | Messinger | Dec. 13, 1932 |
| 2,334,857 | Ball | Nov. 23, 1943 |
| 2,517,501 | Mennesson | Aug. 1, 1950 |
| 2,527,354 | Christian | Oct. 24, 1950 |
| 2,637,332 | Langworthy | May 5, 1953 |
| 2,730,090 | Holl | Jan. 10, 1956 |
| 2,744,510 | Tyler et al. | May 8, 1956 |
| 2,753,148 | Oetiker | July 3, 1956 |